March 3, 1953     A. J. SHILEY     2,630,032
SQUEEZE TYPE COPPER TUBE BENDER
Filed April 7, 1949     2 SHEETS—SHEET 1
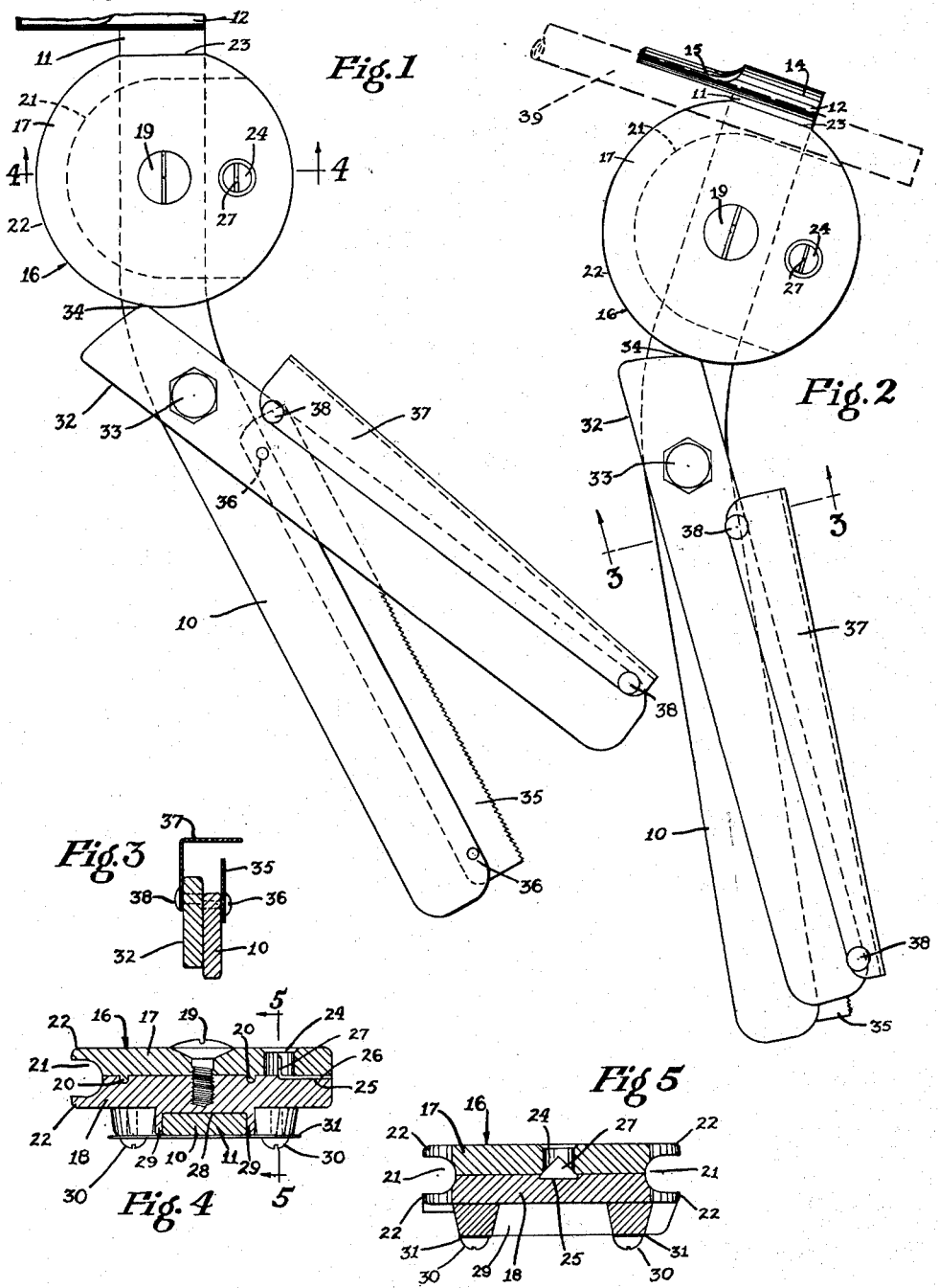
INVENTOR.
Arthur J. Shiley March 3, 1953 A. J. SHILEY 2,630,032
SQUEEZE TYPE COPPER TUBE BENDER
Filed April 7, 1949 2 SHEETS—SHEET 2

*INVENTOR.*
Arthur J. Shiley

BY *W. W. Williamson*
*Atty.*

Patented Mar. 3, 1953

2,630,032

UNITED STATES PATENT OFFICE 2,630,032

SQUEEZE TYPE COPPER TUBE BENDER

Arthur J. Shiley, Philadelphia, Pa.

Application April 7, 1949, Serial No. 85,948

2 Claims. (Cl. 81—15)

My invention relates to a new and useful squeeze type copper tube bender and has for one of its objects to provide a small compact tool to be held in one hand while the tubing is bent around the grooved bending die element of such tool without the other hand until the desired angular bend is obtained.

Another object of this invention is to construct a light weight manually supported and operated tool that can be easily and quickly manipulated for use in bending small size copper tubing.

Another object of the present invention is to provide a combination tool for working on copper tubing, including a bending die slidably mounted on a suitable handle and cooperating with a combined clamp member and gage, said die being moved towards the clamp member by a cam surface on another handle which carries a guard to protect an operator's hand from injury by a saw on the first mentioned handle, and said bending die constructed to provide a reamer for removing any burr on the inside of a tubing end.

Another object of the invention is to provide what I term a stationary handle having an angular head-bar portion on which a substantially circular bending die is slidably mounted, said bending die having a groove extending part way around the perimeter thereof, and said bending die being moved outwardly towards a clamping member on the terminal end of said head-bar portion by a movable handle pivoted to the stationary handle and provided with a cam surface coacting with the bending die which latter retracts by gravity when the tool is held with said bending die at the top of said tool.

A further object of the invention is to provide a tool of the kind mentioned in which a saw blade, ordinarily called a hacksaw, is detachably secured to one handle of the tool and a coacting guard is fastened to the other handle to partially cover the teeth of the saw blade when the two handles are in a closed position thereby protecting an operator's hand from injury.

A still further object of the invention is to construct the bending die of two sections for cheapness of manufacture and to utilize such a construction for clamping a reamer blade between said two sections of the bending die.

With the above and other objects in view this invention consists of the details of construction and combination of elements hereinafter set forth and then designated by the claims.

In order that those skilled in the art to which this invention appertains may understand how to make and use the same I will describe its construction in detail, referring by numerals to the accompanying drawing forming a part hereof, in which:

Fig. 1 is obverse face view of the tool in an open position ready to receive a length of tubing, a portion of the head-bar being broken away.

Fig. 2 is a similar view in a closed position showing, in dotted lines, a piece of tubing clamped in position to be bent.

Fig. 3 is a section of the handles, saw blade and guard on the line 3—3 of Fig. 2.

Fig. 4 is a section through the bending die and stationary handle on the line 4—4 of Fig. 1.

Fig. 5 is a section on the line 5—5 of Fig. 4.

Figure 6:
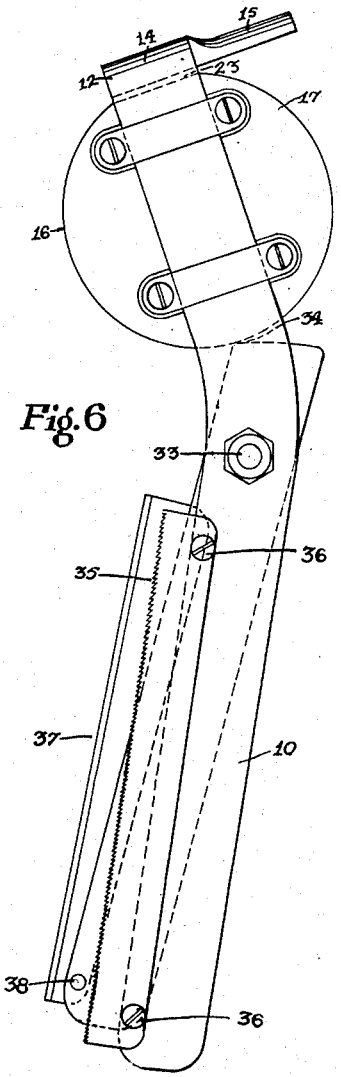
Fig. 6 is a reverse face view of the tool with the handles in closed positions.

In carrying out my invention as herein embodied 10 represents the stationary handle having an angular head-bar portion 11 at its upper end, when considered in connection with the illustration and the manner in which the tool should be held while in use. On the upper or terminal end of the head-bar portion 11 is a clamp 12 offset in front of or from the obverse face of the stationary handle and its head-bar 11. The clamp 12 has an arcuate channel 13 in its underneath surface and actually depends from a gooseneck 14 projecting from the terminal end of the head-bar portion of the stationary handle. The gooseneck and clamp may be formed as integral parts of the stationary handle or as separate elements and joined together in a unitary structure, as by welding. One end, hereinafter referred to as the forward end, is extended in beak-like form to constitute a gage 15 and the underneath surface thereof is a continuation of the channel 13 and, preferably, this gage is concavo-convex in cross section.

A circular bending die 16 is slidably mounted on the head-bar portion 11 of the stationary handle 10 for movements to and from the clamp 12. This bending die is formed of two sections 17 and 18 held together by a fastening device 19 and held against relative rotation by projections 20, Fig. 4, extending from one section into cavities in the other section. On the inner side or meeting face of each member around approximately two-thirds of the circumference thereof is formed a curved wall recess equal to about ninety degrees in cross section so that when the die sections are secured together a groove 21 is formed which is approximately a half circle in cross section although said groove may be recessed slightly more than its radius providing flanking rims 22 which are flattened on the top of the die or adjacent the clamp 12, as indicated at 23, to permit easy insertion of a section of tubing sidewise between the die and clamp.

One section of the die, as the front section 17 has a hole 24, Figs. 4 and 5, completely therethrough from face to face and in the inner face of the other or rear section 18 of said die contiguous the aforesaid hole 24 is formed a slot 25 having an end terminating at approximately the center of said hole and said slot is slightly wider than the diameter of the hole. In the slot 25 is mounted the shank 26 of the generally triangular reamer blade 27 which is at right angles to said shank and projects into the hole 24 with the point of said reamer blade below the surface of the outside face of the front die section 17. The edges of the walls of the hole 24 engage the inclined edges of the reamer blade to prevent to and fro movements of the reamer and as the shank is located in the slot the reamer is held against rotation and said reamer is held in place by the clamping action of the die sections without additional fastening means.

For conveniently slidably mounting the bending die 16 on the head-bar 11 of the stationary handle 10, a trackway 28 is provided between two parallel ribs formed on the outside face or back of the rear die section 18 and the ends of said ribs may be enlarged to provide sufficient stock to receive the screws 30. After the bending die is placed on the stationary handle, with the head-bar 11 in the trackway, said die is held in position by straps 31 of metal disposed across the trackway over the stationary handle and which straps are detachably secured by a pair of oppositely positioned ones of the screws 30.

Figure 7:
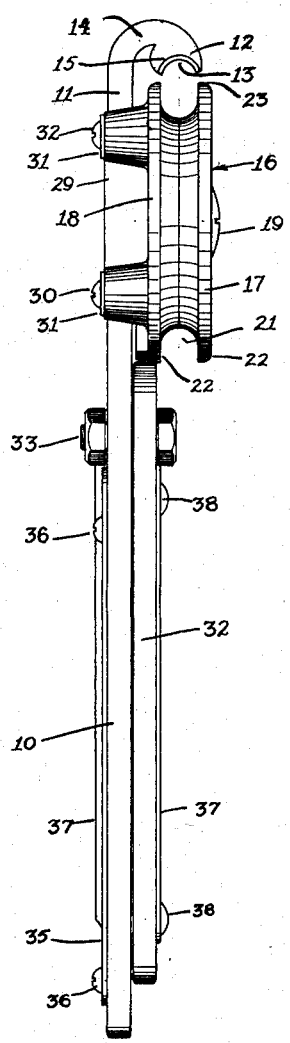
Fig. 7 is an edge view thereof looking towards the right hand side of Fig. 6.

A movable handle 32 is pivoted a distance from its upper or inner end to the stationary handle 10 by a pivot 33 located below the bending die 16 with a cam surface 34 on said upper or inner end to engage the bending die, especially one of the rims 22, as shown in Fig. 7, for forcing the bending die outward or upward towards the clamp 12 which overlies said bending die, as the handles are closed. When the tool is held upright, as illustrated herein, the bending die will slide downwardly by gravity away from the clamp, especially if the handles are opened.

On the outer face of the lower end or handhold portion of the stationary handle 10 is removably mounted a saw blade 35, ordinarily called a hacksaw blade, by screws 36 projected through holes in said saw blade and threaded into the handle. The toothed edge of said saw blade projects beyond the adjacent edge of the stationary handle and substantially parallel thereto. In order to protect an operator's hand from injury by the saw blade while the tool is being used, a guard 37, in the form of an angle iron, has one toe fastened to the outside face of the movable handle along the outer edge thereof by fastening means 38, such as rivets. The other toe of the guard projects inwardly over both handles and the saw blade and, preferably, a short distance beyond said saw blade, as shown in Fig. 3. Said other or free toe of the guard is canted lengthwise relative to the adjacent edge of the movable handle to which the guard is attached so that said free toe diverges from the adjacent handle edge from the outer edge towards the head-bar portion of said movable handle, as plainly shown in Figs. 1 and 2. This arrangement of the guard is necessary because of the relative angular positions of the handles when closed.

In practice, when a piece of tubing, such as shown in dotted lines at 39, Fig. 2, is to be bent, it is placed between the bending die and clamp 12 while said die is retracted. The handles are then pressed towards the closed position in the hand of an operator which will cause the cam surface of the movable handle to force the bending die outwardly towards the clamp and firmly hold the tubing between said die and clamp. The end of the tubing projecting beyond the nose of the gage, forwardly or overhanging the groove in the bending die can then be grasped by the other hand of the operator and bent around the bending die within its groove any necessary distance to fashion the desired bend or angle.

To utilize the gage, any distance from a given point to the location where a bend in a tube is to occur is measured and this measurement laid out from an end of the tube and marked thereon. When the tube is placed in the tool, as above described, the mark on the tube is positioned at the outer end or nose of the gage and the bend made which will be in the exact desired location.

When the tubing is too long, the tool handles are opened to expose the saw blade cutting edge permitting it to be readily used for sawing off any excess. The sawing operation usually causes a burr around the inside edge of the sawed end of the tubing which burr can be removed by inserting the end of the tubing in the hole 24 until said tubing telescopes over the reamer blade 27. Then by rotating the tubing about its axis or imparting a similar motion to the tool the burr will gradually be cut away.

Of course I do not wish to be limited to the exact details of construction herein shown and described as these may be varied within the scope of the appended claims without departing from the spirit of my invention.

Having described my invention what I claim as new and useful is:

1. A tube bender comprising a stationary handle, a clamp at the upper end of said handle, a circular bending die slidably mounted face to face on the upper portion of said handle in line with the clamp, a movable handle pivoted a distance below its upper end to the stationary handle and provided with a cam surface engaging the bending die to project the latter towards said clamp as the handles are moved towards a closed position, said bending die capable of retraction by gravity, and a gage member projecting a distance from the forward end of the clamp approximately equal to one-half of the diameter of said bending die.

2. In a device of the kind described, a stationary handle having an angular upper end constituting a head-bar and the balance thereof forming a handhold, a movable handle pivoted an appreciable distance below its upper end to the stationary handle below the juncture between said head-bar and the handhold, said movable handle having a cam surface on its upper end, a bending die having a peripheral groove around the major portion of its circumference and slidably mounted on the head bar and engaged by the cam surface of the movable handle to be projected outwardly as said movable handle is moved towards a closed position, said bending die being retractable by gravity, a channelled clamp on a gooseneck projecting from the terminal end of the head-bar whereby said clamp is in the path of outward travel of the bending die, said bending die comprised of two circular sections secured together by a single fastening means, each section having a partial circumferential recess in the meeting face to form the aforementioned peripheral groove when said sections are placed together, projections extending from the meeting face of one section and registering with cavities in the meeting face of the other section to prevent relative rotation of said sections, parallel ribs on the outer face of one section to provide a trackway for the head-bar, and straps disposed across the trackway and secured to the ribs whereby the head-bar is slidably retained in said trackway.

ARTHUR J. SHILEY.

REFERENCES CITED

The following references are of record in the file of this patent:

UNITED STATES PATENTS

| Number | Name | Date |
|---|---|---|
| 682,671 | Condon | Sept. 17, 1901 |
| 806,085 | Green et al. | Nov. 28, 1905 |
| 838,705 | Fuller | Dec. 18, 1906 |
| 844,789 | Gardner | Feb. 19, 1907 |
| 899,833 | Minter | Sept. 29, 1908 |
| 1,267,798 | Parnell | May 28, 1918 |
| 2,499,160 | Pfeiffer | Feb. 28, 1950 |

FOREIGN PATENTS

| Number | Country | Date |
|---|---|---|
| 233,231 | Switzerland | Oct. 2, 1944 |